Patented Aug. 28, 1945

2,383,919

UNITED STATES PATENT OFFICE 2,383,919

RECOVERY OF ORGANIC PEROXIDES

Frederick F. Rust, Berkeley, Calif., assignor to Shell Development Company, San Francisco, Calif., a corporation of Delaware No Drawing. Application May 23, 1944, Serial No. 537,009

11 Claims. (Cl. 202—42)

This invention relates to a process for the separation and recovery of organic peroxides and more particularly to the separation of organic peroxides in which each of the peroxy oxygen atoms is directly linked to a tertiary carbon atom of aliphatic character. More specifically, the invention pertains to the recovery of di(tertiary alkyl) peroxides from mixtures containing them and the corresponding tertiary alkyl hydroperoxides and/or alkyl bromides. In one of its specific embodiments, the invention also relates to a process for the separate recovery of di(tertiary alkyl) peroxides and of the corresponding tertiary alkyl hydroperoxides from mixtures containing these peroxides and other organic compounds, the boiling temperatures of which are so close to those of the peroxides as to render the separation of the latter difficult when said separation is effected by ordinary distillation methods.

It has been discovered that organic peroxides may be formed by the controlled non-explosive oxidation of saturated aliphatic hydrocarbons containing a tertiary carbon atom, this oxidation being effected with oxygen, at elevated temperatures (which are, however, below those at which spontaneous combustion occurs), and in the presence of hydrogen bromide which acts as a catalyst promoting the peroxide formation. For instance, it is was found that saturated aliphatic hydrocarbons containing a tertiary carbon atom may be subjected to a controlled non-explosive oxidation (with oxygen or an oxygen-containing material, e. g. air) in the presence of a catalyst consisting of or comprising hydrogen bromide, this oxidation being effected at temperatures of between about 100° C. and the spontaneous combustion temperature of the mixture, in the dark or under the deliberate influence of ultra-violet radiations (particularly those having wavelengths of below about 2900 to 3000 Angstrom units), and in the presence or absence of certain substances which sensitize the reaction; and that such a reaction results in the formation of high yields of certain organic peroxides and organic hydroperoxides. The presence of the hydrogen bromide, besides promoting or catalyzing the aforementioned oxidation and besides retarding the complete combustion of the starting aliphatic hydrocarbon, also has the effect of inhibiting the decomposition of the carbon structure of such organic material, so that the resultant organic hydroperoxides contain the same number of carbon atoms per molecule as the starting hydrocarbon, while the organic peroxides contain twice the number of carbon atoms per molecule as are present in the treated aliphatic hydrocarbon.

It has also been discovered that, although both the tertiary alkyl hydroperoxide and the corresponding di(tertiary alkyl) peroxide are formed during the above-outlined controlled oxidation, the ratio of these products in the effluent may be controlled by regulating the concentration of the hydrogen bromide in the mixture subjected to treatment. For instance, it has been found that the use of relatively high concentrations of the hydrogen bromide tends to favor the production of high yields of di(tertiary alkyl) peroxides, whereas with relatively lower hydrogen bromide concentrations—other conditions being maintained equal—the reaction mixture predominates in tertiary alkyl hydroperoxides. Also, even when the hydrogen bromide catalyzed oxidation of organic compounds containing a saturated tertiary carbon atom of aliphatic character is effected under the optimum operating conditions for the particular reactant or reactants, etc., the resulting reaction product ordinarily contains a certain, although normally relatively small, percentage of by-products formed by the decomposition of the hydrogen bromide and by the reaction of the bromide thus formed with the organic reactant and/or reaction products. For example, when isobutane vapors are subjected to the action of oxygen in the presence of hydrogen bromide under the aforementioned operating conditions, e. g. at a temperature of about 160° C., to effect the oxidation of the isobutane and the production of di(tertiary butyl) peroxide and tertiary butyl hydroperoxide, the reaction mixture also contains greater or lesser amounts of tertiary butyl bromides and of bromo-acetone, as well as tertiary butyl alcohol and minor amounts of acetone, isobutyraldehyde, and the like. Some of the compounds found in such reaction mixtures have boiling temperatures relatively close to the boiling temperature of the di(tertiary butyl) peroxide, so that the separation of the latter by ordinary fractional distillation is quite difficult and entails the use of very large columns. These separations are also difficult because of deviations in behavoir from perfect solutions. Additionally, any ordinary distillation of such mixtures, e. g. mixtures consisting of or containing di(tertiary butyl) peroxide, tertiary butyl hydroperoxide and tertiary butyl alcohol, necessitates the use of elevated temperatures which may cause undesirable decomposition or explosion of the peroxide or peroxides. The same is true of organic mixtures consisting of or containing any di(tertiary alkyl) peroxide and the corresponding tertiary alkyl hydroperoxide and/or alkyl bromides all of which boil within a relatively narrow boiling range.

Still another class of mixtures which it is difficult to separate by ordinary distillation methods includes mixtures consisting of or comprising a given di(tertiary alkyl) peroxide and the corresponding tertiary alkyl hydroperoxide and tertiary alcohol.

It is therefore the main object of the invention to avoid the above and other defects and to provide a simple and economical process for the separation of the above-defined and hereinbelow more fully described class of organic peroxides from mixtures containing them and the corresponding hydroperoxides, alcohols and/or bromides. Another object is to provide a process whereby di(tertiary alkyl) peroxides may be readily separated from organic mixtures containing them and the corresponding tertiary alkyl hydroperoxides and/or alkyl bromides. Still another object is to produce efficiently, economically and simply a superior yield of substantially pure di(tertiary alkyl) peroxides from organic mixtures containing them. A further object is to recover separately di(tertiary alkyl) peroxides and the corresponding tertiary alkyl hydroperoxides from organic mixtures which are difficulty separable into their constituents by ordinary fractional distillation. Still other objects of the invention will be apparent from the following disclosures.

It has now been discovered that the above and other objects may be attained by subjecting the above mentioned mixtures of organic compounds boiling within a relatively narrow temperature range, and containing organic peroxides, in which each of the organic radicals is attached to the peroxy oxygen atoms via a tertiary carbon atom of aliphatic character, to fractional distillation in the presence of water and a saturated aliphatic or alicyclic alcohol. This invention is predicated on the discovery that the distillation of the above mentioned and hereinbelow more fully described class of organic peroxides, and particularly of a di(tertiary alkyl) peroxide, in the presence of sufficient amounts of water and a saturated aliphatic or alicyclic alcohol (which alcohol boils within a range not removed substantially more than about 35° C. from the boiling temperature of said peroxide), forms a minimum boiling ternary azeotrope containing an appreciable concentration of the organic peroxide. It has been found also that, whereas a di(tertiary alkyl) peroxide forms a minimum boiling ternary azeotrope with water and a saturated alcohol, the corresponding tertiary alkyl hydroperoxide and the alkyl bromides do not form such ternary azeotropes under the operating conditions. Therefore, when mixtures of these organic compounds are subjected to fractional distillation in the presence of water and the mentioned alcohols, the di(tertiary alkyl) peroxide present in such organic mixture is removed overhead as a low boiling azeotrope, leaving in the residue substantially all of the tertiary alkyl hydroperoxides and/or alkyl bromides originally present in the mixture thus treated. The tertiary alkyl hydroperoxides form a binary azeotrope with water, such azeotropes boiling at temperatures above the boiling temperature of the ternary azeotrope formed between the di(tertiary alkyl) peroxide, alcohol and water. Therefore, when it is desired to recover separately both the di(tertiary alkyl) peroxide and the corresponding hydroperoxide from organic mixtures containing them and other organic compounds from which these peroxides are separable by ordinary distillation methods only with great difficulty, such separation may be effected, in accordance with the present process, by subjecting the organic mixtures to fractional distillation in the presence of sufficient amounts of water and the specified alcohol to form a low boiling ternary azeotrope containing the di(tertiary alkyl) peroxide, continuing this distillation until all of said peroxide is thus removed as an overhead fraction, and then subjecting the remaining mixture to fractional distillation in the presence of water to remove the hydroperoxide in the form of its binary azeotrope with water.

The di(tertiary alkyl) peroxide may be recovered from the ternary azeotrope by any one of the well known methods. For instance, the condensation of the overhead fraction formed by the azeotropic distillation of di(tertiary butyl) peroxides with water and a saturated aliphatic alcohol of the type of tertiary butyl alcohol, or isopropyl alcohol, forms two liquid phases, one being the aqueous and the other the organic phase containing the di(tertiary butyl) peroxide and some alcohol. This latter phase, after separation from the aqueous phase, may be washed with water to separately recover the alcohol, thus leaving a substantially pure di(tertiary butyl) peroxide. Both the alcohol and water thus separated may be returned to the primary distillation zone, while the di(tertiary alkyl) peroxide may, if desired, be subjected to further distillation in a separate auxiliary column (preferably under a subatmospheric pressure) to obtain an alcohol-free di(tertiary alkyl) peroxide. As to the separation of the hydroperoxide from its azeotrope with water, this may be effected, for example, by drying or by addition of compounds such as sodium sulfate to salt out the water.

The process of the present invention is applicable to the treatment of all organic mixtures containing organic peroxides in which each of the peroxy oxygen atoms is directly linked to an organic radical via a tertiary carbon atom of aliphatic character. A particulrly suitable class of such organic peroxides comprises the symmetrical and asymmetrical di(tertiary alkyl) peroxides, which may be separated, in accordance with the present process, from organic mixtures containing them and the corresponding tertiary alkyl hydroperoxides, alcohols and/or organic bromides. This class of di(tertiary alkyl) peroxides may be represented by the formula

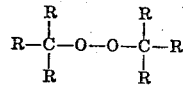

wherein each R represents a like or different alkyl and preferably saturated alkyl radical which may or may not be further substituted. The following are illustrative examples of such peroxides: di(tertiary butyl) peroxide, di(tertiary amyl) peroxide, di(2-methyl pentyl-2) peroxide, di(3-methyl pentyl-3) peroxide, di(2-ethyl butyl-2) peroxide, and the like, and their homologues, as well as asymmetrical di(tertiary alkyl) peroxides exemplified by tertiary butyl-tertiary amyl peroxide and its homologues. Included in this class are also the halo-substituted derivatives such as di(1-halo 2-methyl propyl-2) peroxide, di(1-halo 2-ethyl propyl-2) peroxide, di(1-halo 2-methyl butyl-2) peroxide, di(1-halo 3-methyl butyl-3) peroxide, di(2-halo 3-methyl butyl-3) peroxide, as well as compounds in which one or more of the aliphatic radicals attached to the tertiary carbon atoms (which are in turn directly attached to the peroxy oxygen atoms) are substituted by or contain aryl, aralkyl, alkaryl and/or alicyclic radicals, examples of such compounds being: di(1-phenyl 1-methyl propyl-1) peroxide, di(1-phenyl 2-methyl propyl-2) peroxide, and di(1-cyclohexyl 2-methyl butyl-2) peroxide.

The organic mixtures containing one or more of the above defined peroxides may also contain the corresponding hydroperoxides, i. e. compounds in which an organic radical is attached to the —OOH radical, the organic radical being preferably attached to the peroxy oxygen atom via a saturated tertiary carbon atom of aliphatic character. This class of compounds may be exemplified by tertiary butyl hydroperoxide, tertiary amyl hydroperoxide, and the like and their homologues as well as halo-substituted derivatives and compounds in which one or more of the aliphatic radicals are substituted by or contain aryl, aralkyl, alkaryl and/or alicyclic radicals. The organic mixtures containing these peroxides and hydroperoxides may also contain other organic compounds such as alcohols, alkyl bromides, and the like, of which the boiling temperatures are so close to those of the peroxides as to render the separation of the latter difficult by ordinary methods. Additionally, as stated, ordinary distillation may cause decomposition and explosion hazards. The concentrations of the various organic compounds in the organic mixture subjected to azeotropic distillation in accordance with the present process may vary within relatively wide limits, and will depend in part upon the source of such mixtures. Generally, the content of the peroxides should be at least about 5% by volume for economical separation. The mixtures should preferably be free from highly reactive organic compounds, such as di-olefins, acetylenes, and the like, because the latter may tend to react under the operating conditions, thus interfering with the process and decreasing its effectiveness. The alcohol employed to form a minimum boiling ternary azeotrope together with the water and the organic peroxide to be separated should boil within 35° C. (and preferably less) of the peroxide. The alcohol should be stable at its boiling temperature and must not react with the peroxide, hydroperoxide or other organic compounds of the mixture under the conditions of the process. The preferred class of such alcohols comprises the saturated aliphatic and alicyclic alcohols, e. g. ethyl alcohol, n-propyl alcohol, isopropyl alcohol, n-butyl alcohol, isobutyl alcohol, secondary butyl alcohol, tertiary butyl alcohol, n-amyl alcohol, secondary butyl carbinol, isoamyl alcohol, neopentyl alcohol, pentanol-2, pentanol-3, methyl isopropyl carbinol, tertiary amyl alcohol, cyclobutanol, cyclobutyl carbinol, cyclopentyl alcohol, and the like, and their homologues. The amount of water and alcohol employed should be at least enough to azeotrope with substantially all of the di(tertiary alkyl) peroxides present in the mixture to be separated, said amounts of water and the alcohol varying, depending on the concentration of the peroxide in the mixture and also on the particular alcohol employed. To insure complete separation of the di(tertiary alkyl) peroxide it is desirable that at least a slight excess of both water and alcohol be used. In this connection it must be noted that saturated aliphatic alcohols form minimum boiling binary azeotropes with water, which azeotropes boil at a temperature above the boiling temperature of the ternary with the peroxide. Therefore, any excess alcohol in the mixture may be readily separated after all of the di(tertiary alkyl) peroxide has been removed as its azeotrope with alcohol and water necessary to form the azeotrope. Any further distillation will remove thereafter a binary azeotrope containing the remaining alcohol. When tertiary alkyl hydroperoxides are also present in the organic mixtures subjected to distillation, and when it is desired to recover such hydroperoxides as an overhead fraction, it is necessary in accordance with one phase of the present invention to have water present in an amount sufficient to form a minimum boiling binary with the hydroperoxide. For example, when a mixture containing both di(tertiary butyl) peroxide and tertiary butyl hydroperoxide is to be treated in accordance with the process of the present invention to separately recover the two peroxides, the distillation of such a mixture in the presence of excess amounts of tertiary butyl alcohol and water will cause the removal of a ternary azeotrope comprising di(tertiary butyl) peroxide, tertiary butyl alcohol, and water, at a temperature of 77° C. until substantially all of the peroxide has been thus removed as an overhead fraction. Further distillation will cause the separation of an alcohol-water binary at a temperature of about 80° C. After the removal of all of the alcohol and if further distillation of the remaining mixture is effected in the presence of excess water, a minimum boiling binary azeotrope consisting of tertiary butyl hydroperoxide and water will be removed as an overhead at a temperature of about 93° C.

Since the minimum boiling ternary azeotropes will vary in composition, depending on the particular di(tertiary alkyl) peroxide to be removed and on the particular alcohol employed, the amount of the latter (as well as of the water) necessary to remove all of the di(tertiary alkyl) peroxide will vary accordingly. For instance, in the case of separation of di(tertiary butyl) peroxide from mixtures containing it and tertiary butyl hydroperoxide and alkyl bromides of the type of isobutylene dibromide, it was found that the ternary azeotrope formed with water and tertiary butyl alcohol contains 44.0 weight percent of the peroxide, 6.7 weight percent water, and 49.3 weight percent of the tertiary butyl alcohol. On the other hand, the same peroxide forms a ternary azeotrope with water and isopropyl alcohol, which azeotrope contains 54 weight percent of di(tertiary butyl) peroxide, 41% of isopropyl alcohol, and 5% water.

The process of the present invention may be carried out either continuously or intermittently as well as by batch operation. The particular method of operation will depend on the specific organic mixture to be treated and, in part, on whether or not hydroperoxides are present and whether it is desirable to remove the latter as an overhead fraction after the removal of the di(tertiary alkyl) peroxides. In this connection, it must be noted that although tertiary alkyl hydroperoxides, e. g. tertiary butyl hydroperoxide, are partially soluble in water, whereas the corresponding di(tertiary alkyl) peroxides are substantially insoluble therein, the hydroperoxides are highly soluble in the diperoxide so that their recovery from mixtures consisting of or comprising these two peroxides by mere water washing is very difficult, if not impossible.

The following examples are given for illustrative purposes only.

Example I

A mixture consisting of about 60% of tertiary butyl hydroperoxide, approximately 15% of di(tertiary butyl) peroxide, and about 25% of tertiary butyl alcohol was subjected to fractional distillation in the presence of water employed in an amount in excess of that necessary to form a ternary azeotrope with all of the di(tertiary butyl) peroxide and the requisite amount of tertiary butyl alcohol present in the mixture treated. The constant boiling ternary azeotrope had a temperature of 77° C. and, upon condensation, formed two phases, the upper phase comprising all of the di(tertiary butyl) peroxide and some alcohol. This phase was water-washed to remove the alcohol.

Example II

An organic mixture containing di(tertiary butyl) peroxide and tertiary butyl hydroperoxide was fractionally distilled in the presence of isopropyl alcohol and water employed in amounts in excess of those necessary to form a minimum boiling azeotrope with all of the di(tertiary butyl) peroxide present in the treated mixture. The azeotrope had a boiling temperature of about 75.9° C. The di(tertiary butyl) peroxide was recovered from the condensate in the manner described above. All of the hydroperoxide remained in the residue, the excess alcohol being recovered as a binary with water.

Example III

Isobutane was oxidized in a coil of glass having an internal diameter of 25 cm., this coil having a volume equal to 2940 cc. and being immersed in an oil bath to permit accurate control of the reaction conditions. A preheated vaporous mixture of isobutane, oxygen and hydrogen bromide, which were used in a volumetric ratio of 2:2:1, was conveyed through the reactor at substantially atmospheric pressure, at a temperature of about 158° C., and at such a rate that the residence time was equal to about 3 minutes. The reaction products were conveyed through water to separate the water-soluble compounds from the water-insoluble phase. The bromine formed in both phases was removed by adding a sufficient amount of a phenol solution to just decolorize the material. The water-insoluble organic phase was water-washed until no further volume decrease occurred, the water-washings being combined with the aqueous phase. This water-immiscible organic phase was found to contain di(tertiary butyl) peroxide, alkyl bromides, and tri-bromophenol. Water and tertiary butyl alcohol were then added to this phase and the mixture was subjected to fractional distillation. A minimum boiling ternary azeotrope of the peroxide with the alcohol and water was removed as an overhead fraction at a temperature of 77° C. The condensate separated into two phases; the organic phase of the distillate (which is about 45% di-tertiary butyl—peroxide) was washed with water and 30% sulfuric acid to remove the tertiary butyl alcohol present therein. The di(tertiary butyl) peroxide may then be further purified by vacuum distillation.

The tertiary butyl hydroperoxide was removed from the aqueous phase in the form of a binary with water, said binary azeotrope boiling at about 93° C.

Example IV

When a mixture containing di(tertiary amyl) peroxide and tertiary amyl hydroperoxide is distilled in the presence of water and n-amyl alcohol, a low boiling ternary azeotrope consisting of the di(tertiary amyl) peroxide, water and alcohol is removed as an overhead fraction, the tertiary amyl hydroperoxide remaining as a residue.

The di(tertiary alkyl) peroxides possess properties which adapt them admirably for use in various organic reactions as well as for other purposes. These peroxides may be employed as catalysts for different chemical reactions such as the formation of plastics of the type of diallyl phthalate and/or acrylate resins. Also, they may be used as additives to improve the cetane value of Diesel engine fuels. Furthermore, these di(tertiary alkyl) peroxides may be employed to purify aqueous solutions of saturated as well as unsaturated alcohols by distillation and removal of a constant boiling mixture comprising the peroxide, alcohol and water. The ternary azeotrope thus obtained may be condensed, and stratified to obtain an alcohol phase and an aqueous alcoholic phase. The former comprises all of the di(tertiary alkyl) peroxide and some alcohol, which latter may be removed by water-washing. The aqueous phase comprises substantially all of the water and a major amount of the alcohol. As mentioned, the composition of the minimum boiling ternary azeotropes will vary depending on the particular di(tertiary alkyl) peroxide employed and the specific alcohol to be thus purified. Generally speaking, these ternary azeotropes will contain major amounts of the peroxide and alcohol and minor amounts of water.

I claim as my invention:

1. In a process for the separation of di(tertiary butyl) peroxide from a mixture containing it and tertiary butyl hydroperoxide, the steps of distilling said mixture in the presence of tertiary butyl alcohol and water to produce an overhead ternary azeotrope comprising the di(tertiary butyl) peroxide, water and tertiary butyl alcohol, condensing said overhead fraction, thereby forming two phases, the upper of which comprises di(tertiary butyl) peroxide and tertiary butyl alcohol, and separating substantially pure di(tertiary butyl) peroxide from said upper phase.

2. The process according to claim 1 wherein the di(tertiary butyl) peroxide is separated from its mixture with tertiary butyl alcohol by water washing.

3. In a process for the separation of di(tertiary butyl) peroxide from a mixture containing it and tertiary butyl hydroperoxide, the steps of distilling said mixture in the presence of isopropyl alcohol and water to produce an overhead ternary azeotrope comprising the di(tertiary butyl) peroxide, water and isopropyl alcohol, condensing said overhead fraction, thereby forming two phases, the upper of which comprises di(tertiary butyl) peroxide and isopropyl alcohol, and separating substantially pure di(tertiary butyl) peroxide from said upper phase.

4. In a process for the separation of di(tertiary butyl) peroxide from a mixture containing it and tertiary butyl hydroperoxide, the steps of distilling said mixture in the presence of water and of a stable saturated alcohol boiling within about 35° C. of the boiling temperature of the di(tertiary butyl) peroxide to produce an overhead ternary azeotrope comprising the di(tertiary butyl) peroxide, water and the alcohol, and a bottom product containing substantially all of the tertiary butyl hydroperoxide, condensing the overhead fraction and recovering the di(tertiary butyl) peroxide.

5. In a process for the separation of di(tertiary alkyl) peroxide from a mixture containing it and the corresponding tertiary alkyl hydroperoxide, the steps of distilling said mixture in the presence of water and of a stable saturated alcohol boiling within about 35° C. of the boiling temperature of the di(tertiary alkyl) peroxide to produce an overhead ternary azeotrope comprising the di(tertiary alkyl) peroxide, water and the alcohol, condensing said overhead fraction and recovering the di(tertiary alkyl) peroxide therefrom.

6. In a process for the separation of a di(tertiary alkyl) peroxide from a mixture containing it and the corresponding tertiary alkyl hydroperoxide, the steps of distilling said mixture in the presence of a stable alcohol boiling within about 35° C. of the boiling temperature of the di(tertiary alkyl) peroxide, thereby producing a minimum boiling ternary azeotrope overhead comprising the di(tertiary alkyl) peroxide, water and the alcohol, condensing said overhead fraction, and recovering the di(tertiary alkyl) peroxide therefrom.

7. In a process for the separation of di(tertiary alkyl) peroxide from a mixture containing it and the corresponding tertiary alkyl hydroperoxide, the steps of distilling said mixture in the presence of water and of a stable alcohol boiling within about 35° C. of the boiling temperature of the di(tertiary alkyl) peroxide, thereby producing a minimum boiling ternary azeotrope overhead comprising the di(tertiary alkyl) peroxide, water and the alcohol, and separating the di(tertiary alkyl) peroxide from said overhead fraction.

8. In a process for the separation of a di(tertiary alkyl) peroxide from a mixture from which it is difficultly separable by ordinary distillation, the steps of distilling said mixture in the presence of water and of a stable alcohol boiling within about 35° C. of the boiling temperature of the di(tertiary alkyl) peroxide, thereby producing an overhead ternary azeotrope comprising the di(tertiary alkyl) peroxide, water and the alcohol, condensing said overhead fraction, and recovering the di(tertiary alkyl) peroxide from said condensate.

9. In a process for the separation of a di(tertiary alkyl) peroxide from a mixture from which it is difficultly separable by ordinary distillation, the steps of distilling said mixture in the presence of water and of a stable alcohol boiling within about 35° C. of the boiling temperature of the di(tertiary alkyl) peroxide, thereby producing an overhead ternary azeotrope comprising the di(tertiary alkyl) peroxide, water and the alcohol, and recovering the di(tertiary alkyl) peroxide from said overhead fraction.

10. In a process for the separate recovery of di(tertiary butyl) peroxide and of tertiary butyl hydroperoxide from mixtures containing said compounds, the steps of subjecting said mixture to distillation in the presence of tertiary butyl alcohol and water to produce an overhead ternary azeotrope comprising di(tertiary butyl) peroxide, water and tertiary butyl alcohol, separately recovering the di(tertiary butyl) peroxide from said overhead fraction, continuing the distillation to recover the remaining tertiary butyl alcohol as a binary azeotrope with water, and subjecting the remaining bottom fraction to distillation in the presence of water to recover an overhead fraction comprising a binary azeotrope of tertiary butyl hydroperoxide and water.

11. In a process for the separate recovery of di(tertiary butyl) peroxide and of tertiary butyl hydroperoxide from mixtures containing said compounds, the steps of contacting said mixture with water to produce a water-soluble phase and a water-insoluble phase, separating said phases, subjecting the water-insoluble phase to distillation in the presence of tertiary butyl alcohol and water to produce an overhead ternary azeotrope comprising di(tertiary butyl) peroxide, water and tertiary butyl alcohol, separately recovering the di(tertiary butyl) peroxide from said ternary azeotrope and subjecting the above-mentioned water-soluble phase to distillation to produce said binary azeotrope comprising water and tertiary butyl hydroperoxide.

FREDERICK F. RUST.